May 1, 1934.  G. G. JERNER  1,957,066
ELECTRICAL OUTLET BOX AND THE LIKE
Filed Jan. 15, 1932
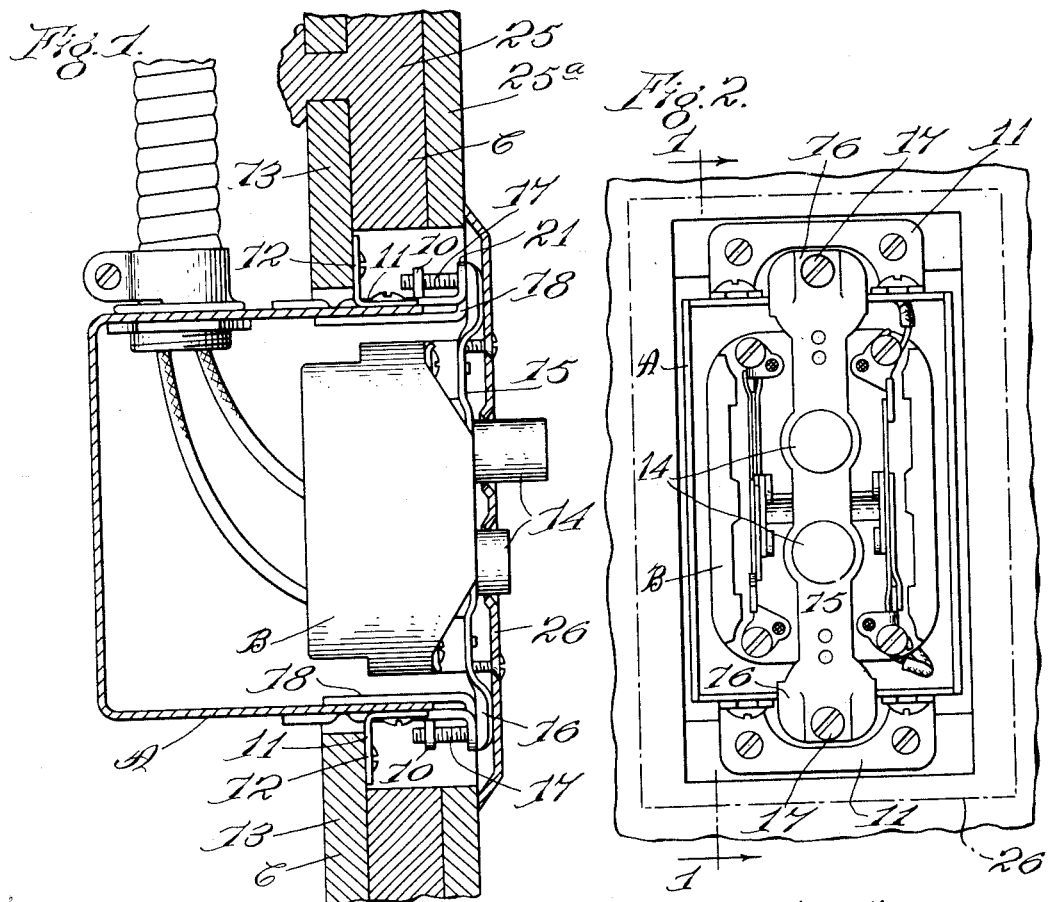
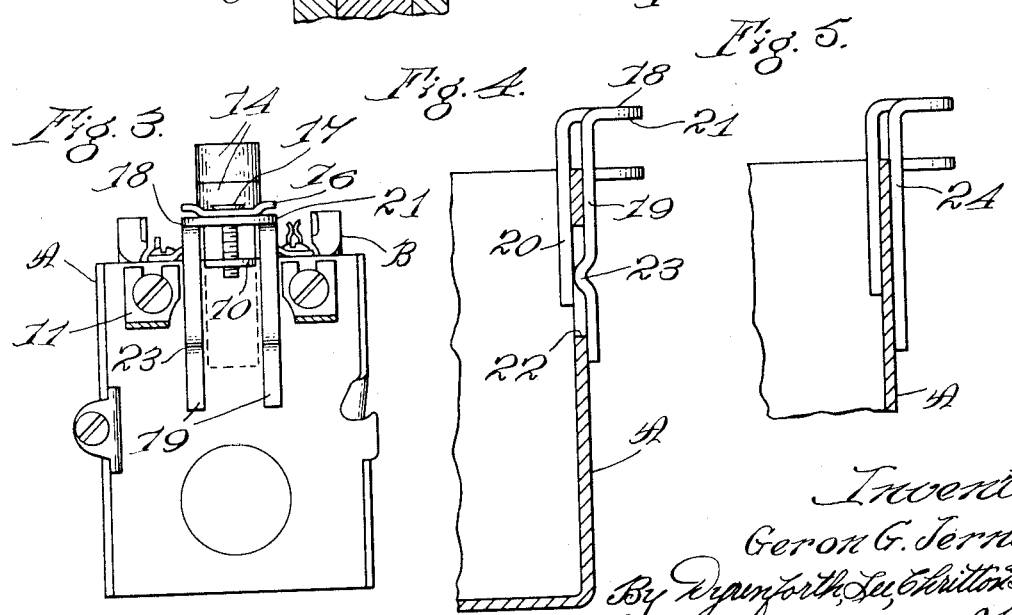
Inventor:
Geron G. Jerner.

Patented May 1, 1934

1,957,066

UNITED STATES PATENT OFFICE 1,957,066

ELECTRICAL OUTLET BOX AND THE LIKE

Geron G. Jerner, Lake Forest, Ill., assignor of one-half to Marion T. Martin, Chicago, Ill.

Application January 15, 1932, Serial No. 586,772

5 Claims. (Cl. 247—19)

This invention relates to improvements in electrical outlet boxes and similar appliances such as switch plates, electrical receptacle plates, electrical flush cabinets, switch mechanisms, etc. and more particularly to an adjustable extension member for supporting the front plate or bridge on outlet boxes or other forms of wall boxes.

One outstanding defect in electrical outlet boxes, heretofore used, has been that such boxes, after installation, do not support the switch mechanism in the desired alignment with the front face of the plaster wall. This is largely due to the fact that the depth of the plaster layer can not be accurately determined prior to the plastering operation. In the usual practice, the outlet boxes are secured within the framework of the wall before the plaster is laid. It is then discovered that the switch mechanism is supported by the box in such a manner that it projects beyond the face of the plaster wall or is supported too far back of the plaster wall. To remedy the defect, the outlet box must be removed and replaced within the wall in such a manner as to bring the front portion of the bridge element substantially flush with the outer wall of the plaster. If the box should be set within the wall after the plaster has been laid, a less common operation because of the greater difficulty in attaching the outlet box in the wall after the plaster is on, the depth of the plaster layer usually requires some change of the support for the box in order to accurately align the front portion of it with the face of the plaster wall. In order to overcome the difficulty produced by the uncertainty as to the depth of the finished plaster layer, I have produced an outlet box equipped with means for adjustably supporting the switch mechanism after the outlet box has been fixed in position. With my improved construction, the outlet box may be fixed within the frame of the wall prior to the plastering operation and then, after the plaster has been laid, may be readily adjusted so as to support the switch element in the desired position with respect to the face of the plaster wall.

Other objects and advantages will appear as the specification proceeds.

The invention is fully described in the following specification and shown in the accompanying drawing, in which—

Figure 1 is a section view of apparatus embodying my invention shown applied to a wall, the section being taken as indicated at line 1 of Fig. 2; Fig. 2, a front view in elevation; Fig. 3, an end view in elevation; Fig. 4, an enlarged, part sectional view, showing my preferred form of attachment bracket; and Fig. 5, a view similar to Fig. 4, showing a modified form of attachment bracket.

In the illustration given, A represents an outlet box; B, switch mechanism supported by outlet box A; and C, a wall to which outlet box A is attached.

The outlet box A may be of any suitable construction. It is preferably formed of sheet metal in substantially rectangular form, and closed on all sides except one. On each end of the box, adjacent the open side thereof, are formed ears or attachment bosses 10, which ears are preferably perforated and threaded. As shown more clearly in Figs. 1, 2 and 3, a fixed bracket 11 is secured to each end of the box adjacent the attachment bosses 10. Each bracket is provided with a perforated right angle flange 12 by which the bracket may be secured to a frame member 13 which forms part of the wall C. By this means, box A is fixedly secured to the frame structure of wall C.

The switch apparatus B may be of any suitable or well known construction, the switch or contact members being actuated by push buttons 14 or other suitable means. For the purpose of the present invention, it will not be necessary to describe the switch mechanism.

In order to secure the switch mechanism B to the outlet box A, a bridge member 15, of well known construction, is fixed to the frame of the bridge apparatus and is provided with attachment arm extensions 16. The ends of the arms are perforated to receive attachment screws 17.

In order to enable the outlet box A to support adjustably the bridge 15 at the desired distance or distances from outlet box A, I prefer to employ attachment or extension brackets 18, as shown more in detail in Fig. 4. Preferably, the extension bracket is provided with flanged extensions 19 and 20 adapted to engage opposite sides of the metal wall of the box, that is, one leg 20 engaging the inner face of the box wall, while the other leg or legs 19 engage the outer face of the metal wall. The outer end of the bracket is preferably turned at right angles to form an attachment flange 21, which flange is preferably perforated and threaded to receive attachment screw 17. With the construction shown, the attachment bracket is held in sliding contact with the wall of the box by the extensions 19 and 20. In order to secure the bracket to box A without interfering with the sliding movement of the bracket, I prefer to form a slot 22 in each end of the box and a bend 23 in leg 19 of the bracket. The slot 22 receives the indentation or bend 23 of leg 19, and while it permits sliding movement of the bracket, it limits the extension of the bracket and prevents withdrawal of the bracket from the box, at least under ordinary handling. If it is desired to detach the bracket, the leg 19 may be swung outwardly to remove indentation 23 from engagement with slot 22.

While I have shown the preferred form of attachment bracket, illustrated in Fig. 3, as provided with means connecting the bracket to the box, such means may be dispensed with, as exemplified by the bracket 24 shown in Fig. 5.

While I have shown only one means of providing sliding engagement between brackets 18 and 24 and box A, and only one method of slidably connecting the bracket to the box, it will be obvious that these objects may be accomplished by many satisfactory methods known to the art. It is not believed necessary to illustrate the many possible interconnections between the box and the sliding bracket by which the bracket will be rigidly supported in sliding contact with the box and in interlocking relation therewith.

In the operation of the outlet box and its adjustable attachment 24, the box A is preferably secured to frame member 13 of wall C before the plaster 25 is formed. To accomplish this object, the flange 12 of fixed bracket 11 is secured by screws, nails, etc. to the frame 13 of wall C. The plaster is then laid, first the rough plaster 25, and then the finishing layer of plaster 25a. After the plaster wall is completed, the bridge member 15, which supports the switch mechanism B, is drawn forwardly to a point substantially flush with the outer face of the plaster and the attachment brackets 18 at the ends of the box are drawn forwardly into contact with the ends 16 of bridge 15. Attachment screw 17 is then passed through the perforation in the arm or end 16, the threaded perforation in flange 20 of attachment bracket 18, and then through the boss or attachment ear 10, with which the box A is provided. By this means, the bridge 15 is rigidly secured to attachment bracket 18 and boss 10. The spaced arms 19 and 20 of the attachment bracket 18 firmly engage the end walls of box A and support the bridge 15 as effectively as though the attachment bracket were an integral part of box A.

After the bridge has been secured in the desired position, a cover 26 of the type usually employed, and as shown more clearly in Fig. 1, is placed over the box and switch mechanism to conceal all of the parts, except the push buttons 14.

The extension bracket members described are simple, sturdy, and permit ready adjustment of the switch mechanism to the proper position with respect to the plaster wall, while at the same time supporting the mechanism as rigidly as would the box itself. In the appliances heretofore used, in which the switch mechanism was supported by screws, the screws tended to corrode, thus preventing a proper ground through the screws. With my attachment bracket, a flat surface contact is obtained, thus making a good permanent contact. The attachment bracket members may be formed as a part of the box itself, or they may be sold as separate items to be connected to an outlet box at the time of its installation. The appliance is also useful for replacing switches in old houses where the plaster depth is uncertain. The extension bracket also permits ready adjustment of the contact mechanism in base plugs to bring the face of the base plugs flush with the outer wall surface.

The foregoing detailed description has been given for clearness of understanding only, and no unnecessary limitations should be understood therefrom, but the appended claims should be construed as broadly as permissible, in view of the prior art.

I claim:

1. In combination with an outlet box having a wall provided with a slot, an extension bracket extending beyond the outer face of the box provided with spaced legs engaging opposite faces of said wall, one of said legs being provided with a segment adapted to engage said slot and to limit the extension of said bracket.

2. In combination with a wall box having an open front side and a threaded attachment boss adjacent the front side, said box being provided with a switch-supporting bridge for the front side thereof, an adjustable support for said switch-supporting bridge adapted to extend beyond the front face of the box and having a rear extension slidably engaging the wall of said box, and threaded locking means operable from outside the switch-supporting bridge and extending through and uniting said bridge, adjustable support and attachment boss.

3. In combination with a wall box equipped with a threaded attachment boss and having a switch-supporting bridge, an adjustable support extending beyond the front face of the box and having a rear extension slidably engaging a wall of said box, and a locking screw extending through said bridge, said support and said attachment boss to lock the bridge upon said adjustable support.

4. In combination with an outlet box having a wall provided with a slot, an extension bracket extending beyond the outer face of the box and provided with spaced legs engaging opposite faces of said wall, and means carried by at least one of said legs and extending into said slot to limit the extension of the bracket.

5. In combination with a wall box having a threaded attachment boss at each end and also having a switch-supporting bridge, an adjustable support extending beyond the front face of the box and having rear extensions slidably engaging the end walls of said box, and locking screws extending through said bridge, said adjustable supports and said attachment bosses to lock the bridge upon said adjustable supports.

GERON G. JERNER.